United States Patent
Zibuschka et al.

(12) 
(10) Patent No.: US 6,386,303 B1
(45) Date of Patent: May 14, 2002

(54) METHOD FOR CONTROLLING THE POWER TAKE-OFF SHAFT OF A TRACTOR

(75) Inventors: Alfred Zibuschka, Linz; Oliver Hrazdera, Enns, both of (AT)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/674,562

(22) PCT Filed: May 6, 1999

(86) PCT No.: PCT/AT99/00112

§ 371 Date: Dec. 20, 2000

§ 102(e) Date: Dec. 20, 2000

(87) PCT Pub. No.: WO99/56978

PCT Pub. Date: Nov. 11, 1999

(30) Foreign Application Priority Data

May 6, 1998 (AT) ............................... 293/98

(51) Int. Cl.[7] ............ A01B 63/02; A01B 71/00; B60K 20/02; B60K 25/00
(52) U.S. Cl. ............ 180/53.3; 701/50; 74/11
(58) Field of Search ............. 180/53.1, 53.3; 701/50, 52, 67; 74/11, 15.82, 15.84

(56) References Cited

U.S. PATENT DOCUMENTS 5,558,163 A * 9/1996 Hollstein ................. 172/2
5,592,029 A * 1/1997 Hollstein et al. ........... 307/9.1
5,806,640 A * 9/1998 Kale ........................... 74/11
6,173,225 B1 * 1/2001 Stelzle et al. ............... 701/50

FOREIGN PATENT DOCUMENTS

| DE | 40 01 398 | * | 7/1991 |
| EP | 0517384 | * | 12/1982 |
| JP | 6-209603 | * | 8/1994 |

* cited by examiner

Primary Examiner—Peter C. English
(74) Attorney, Agent, or Firm—John William Stader; Larry W. Miller

(57) ABSTRACT

The invention relates to a method for controlling the drive of the power take-off (PTO) shaft of a tractor in which the PTO shaft can be connected to the drive engine by means of a PTO shaft clutch. The tractor comprises a hydraulic power lift to which a working machine driven by the PTO shaft can be coupled. In order to improve safety and operational comfort, the inventive method is comprised of the following steps: a) the PTO shaft clutch is engaged by means of a pulse-width-modulated on/off valve when the switch for turning on the PTO shaft is activated such that the clutch starts working in a controlled manner; b) if, afterwards, the switch for changing over to an automatic mode is actuated, the PTO shaft clutch is disengaged when the power lift is lifted; when the lift is not lifted, the PTO shaft clutch remains engaged: c) if the power lift is lowered again within a predetermined time interval, the PTO shaft clutch automatically reengages; however, the clutch no longer engages after this time interval has elapsed.

9 Claims, 4 Drawing Sheets

SAFETY FUNCTIONS

METHOD FOR CONTROLLING THE POWER TAKE-OFF SHAFT OF A TRACTOR

FIELD OF THE INVENTION

The invention relates to a process for controlling the drive of a tractor power take-off (PTO) shaft wherein the PTO shaft can be connected to the drive engine by a PTO clutch, and the tractor has a hydraulic lift to which an implement driven by the PTO shaft can be connected.

BACKGROUND OF THE INVENTION

The PTO shaft is a high-speed, high-torque working shaft. This shaft and the connected implements represent a considerable hazard to the operator. If the implement becomes clogged or is obstructed, he must lift the implement and leave the operator's cabin to remedy the problem. Operating elements are also frequently provided outside the operator's cabin. To increase safety in such situations, it is known in the practice to automatically disengage the PTO clutch when lifting the implement.

Differentiated safety devices are considered unsafe because of the risk of malfunctions, although they can provide a desired increase in operating comfort. For example, when turning at the edge of a lot, the operator must not only operate the vehicle but also lift the power lift and actuate the PTO clutch. This can produce harsh operating conditions, reducing the service life of the vehicle and implement.

SUMMARY OF THE INVENTION

Therefore, the goal of the invention is to provide a process for automatic control of a PTO shaft so as to fully maintain safety in all situations while requiring the least possible technical effort. In accordance with the invention, this is achieved by the following operating steps:

a) When the switch (11) is actuated to turn on the PTO shaft, the PTO clutch (2) is engaged by a pulse-width-modulated on/off valve (16) to initiate this as an automatic process;

b) If switch (12) is subsequently actuated for transition to an automatic mode, the PTO clutch (2) is disengaged when the power lift (7) is raised; if no lifting is done, the PTO clutch (2) remains engaged;

c) If the power lift (7) is lowered within a prescribed length of time, the PTO clutch (2) is automatically engaged again; after this time elapses, it no longer engages.

Such a control provides for smooth starting after a prescribed pulse-width gradient or rpm gradient and as a function of the rpm's transmitted to the implement, and because of the pulse-width-modulation, a straightforward inexpensive on/off valve can be used. The automatic operation is not obligatory. It can be selected as desired as an operating mode even after operating for some time in the non-automatic mode. In terms of safety engineering, this is taken into account by the fact that, after the automatic mode is selected, the state of the lift is interrogated. If the power lift is raised, the PTO shaft is disengaged, as with known devices, but without additional effort. The prescribed time within which the PTO shaft is automatically engaged again, in the automatic mode, when the lift is lowered is selected so that just enough time is available for turning the edge of the field, but when the lift is lowered after an interruption in the work or after the operator leaves the cabin, the PTO shaft will not automatically engage again. Thus, the required safety is guaranteed for the connection of lift and PTO shaft engagement.

The extra technical effort is minimal because the inventive process is implemented by software. Consequently, the automatic engagement for lowering the lift after a prescribed time interval can be made to depend on additional safety controls.

In controlled starting, a safety measure can be included: The starting of the PTO shaft is interrupted immediately by disengaging the clutch when the switch for actuation is not operated during a certain time interval. Observations have shown that faulty operator motions are identified as they occur but one second late. However, they can be avoided if the operator is obligated to actuate the switch and must do so for a specific length of time.

Preferably, the engagement of the PTO shaft is smooth for a certain initial time interval, and only after this time interval has elapsed can the system be switched to automatic mode. A particularly impact-free and conservative start of the PTO shaft is achieved by taking into account the momentary rotational speed of the shaft during controlled starting of the PTO shaft. For this purpose, the pulse-width at which the PTO shaft starts to move is taken into account. A starting pulse-width is prescribed and is increased until the PTO shaft is moving appreciably. The subsequent portion is slowly traversed.

In a further refinement of the process, when the PTO shaft is switched on, after a prescribed second time interval, which is longer than the first time interval, interrogation is done to determine whether the PTO shaft is actually turning; if not, the PTO clutch is disengaged again. This not only protects the clutch from overload and excessive wear but also protects the operator. At low external temperatures, the PTO shaft may start with a long lag time and the operator may look around to see why the PTO shaft is not starting. This is a frequent cause of serious accidents.

In a preferred process, after the power lift is raised, interrogation is preformed to determine whether the tractor is moving or stopped; if it is moving, the clutch is engaged automatically again only when the power lift is lowered again within a prescribed initial time interval; if it is stopped, the clutch is engaged automatically again only if the power lift is lowered again within a prescribed second time interval; the prescribed second time interval is shorter than the prescribed first time interval. Thus, the time interval is selected. When the tractor has stopped, it is shorter than the time it takes the operator to climb out of the operator's cabin. During travel, it is long enough for a turning maneuver at the edge of the field.

If the tractor also has switches for the power lift located outside the operator's cabin, then in a very safety-related further refinement of the process, the PTO clutch is immediately disengaged and the automatic mode switched on as soon as one of the switches outside the operator's cabin is operated. If in the case of a malfunction, the operator stops, gets out and lifts the implement, the implement is absolutely guaranteed to stop (because the automatic mode is switched on). The malfunction can then be eliminated without risk of an accident. The automatic mode can be re-activated only when the operator has returned to the operator's cabin.

In a further refinement of the process, before the PTO clutch is engaged, the engine rpms are interrogated, and the engagement process is started only when the engine speed is within a specific rpm range. This prevents both jolts and stalling of the engine. Finally, the designing of a control with a processor programmed to accomplish the process herein described is within the scope of the invention. Although the control can also be designed with hardware, processor control is particularly straightforward and readily adaptable to the vehicle requirements in question.

DESCRIPTION OF THE DRAWINGS

In the following, the invention is described and explained on the basis of figures. The following are shown.

DESCRIPTION OF THE PREFERRED EMBODIMENT

Figure 1:
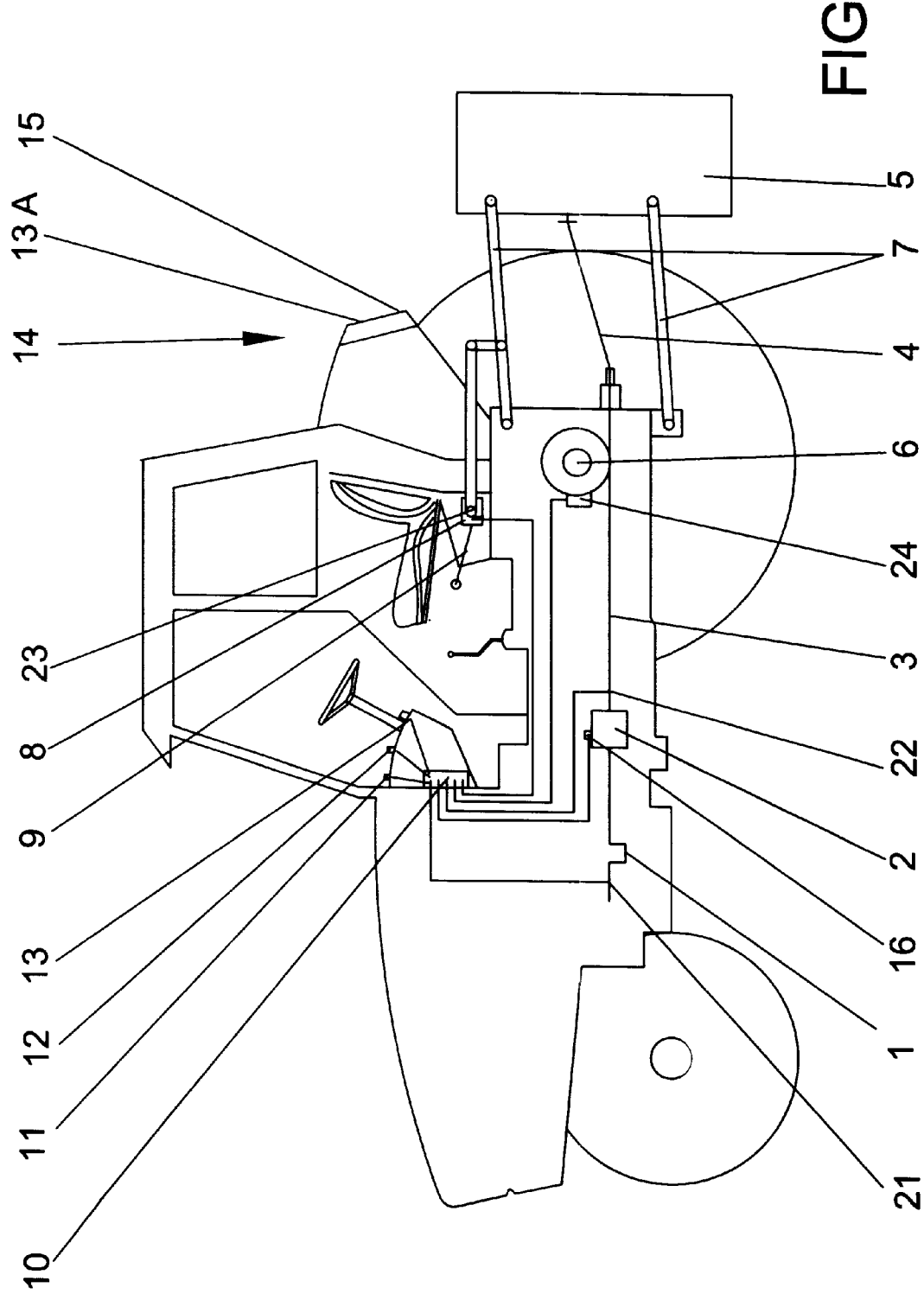
FIG. 1—a tractor with controls, schematic.

In FIG. 1 the engine is not shown but is denoted by 1. To the engine is connected a PTO clutch 2, possibly followed by a multi-step reduction gear for selection of the rated speed of the PTO shaft (540, 750, 1,000 or 1,400 rpm). The PTO clutch 2 is a hydraulic clutch of any design, for example, hydraulic or dry, with one or more disks. From there, a PTO shaft 3 leads to the input shaft 4 of an implement 5 driven by it. The rear axle 6 of the tractor is not shown in detail. Also mounted on the tractor is a power lift 7, which is moved by a hydraulic system 8, which obeys a lifting gear lever 9 in the operator's cabin. In the embodiment illustrated here, the power lift and PTO shaft are arranged at the rear of the tractor; they could also be arranged at the front of the tractor.

A control unit 10 for the PTO clutch is provided at a suitable area in the tractor. The unit contains a processor which repetitively runs the inventive control program and is connected via lines (only indicated schematically) with the following operating elements and sensors: a switch 11, preferably a pushbutton switch, for switching on the PTO; a switch 12 for switching to automatic mode, preferably with two positions; a switch 13, a pushbutton, for switching off the PTO; a switch 13A additionally provided on a control panel 14 accessible from outside the vehicle, for switching off the PTO shaft, together with an additional actuating device 15 for the power lift 7; and on/off valve 16 for the PTO clutch, i.e., a pulse-width-modulated on/off valve; a sensor 21 for the engine speed; a sensor 22 for the PTO shaft rotational speed; a sensor 23 for the position of the power lift and a sensor 24 for the rotational speed of the rear axle, i.e., the speed of the tractor.

Figure 2:
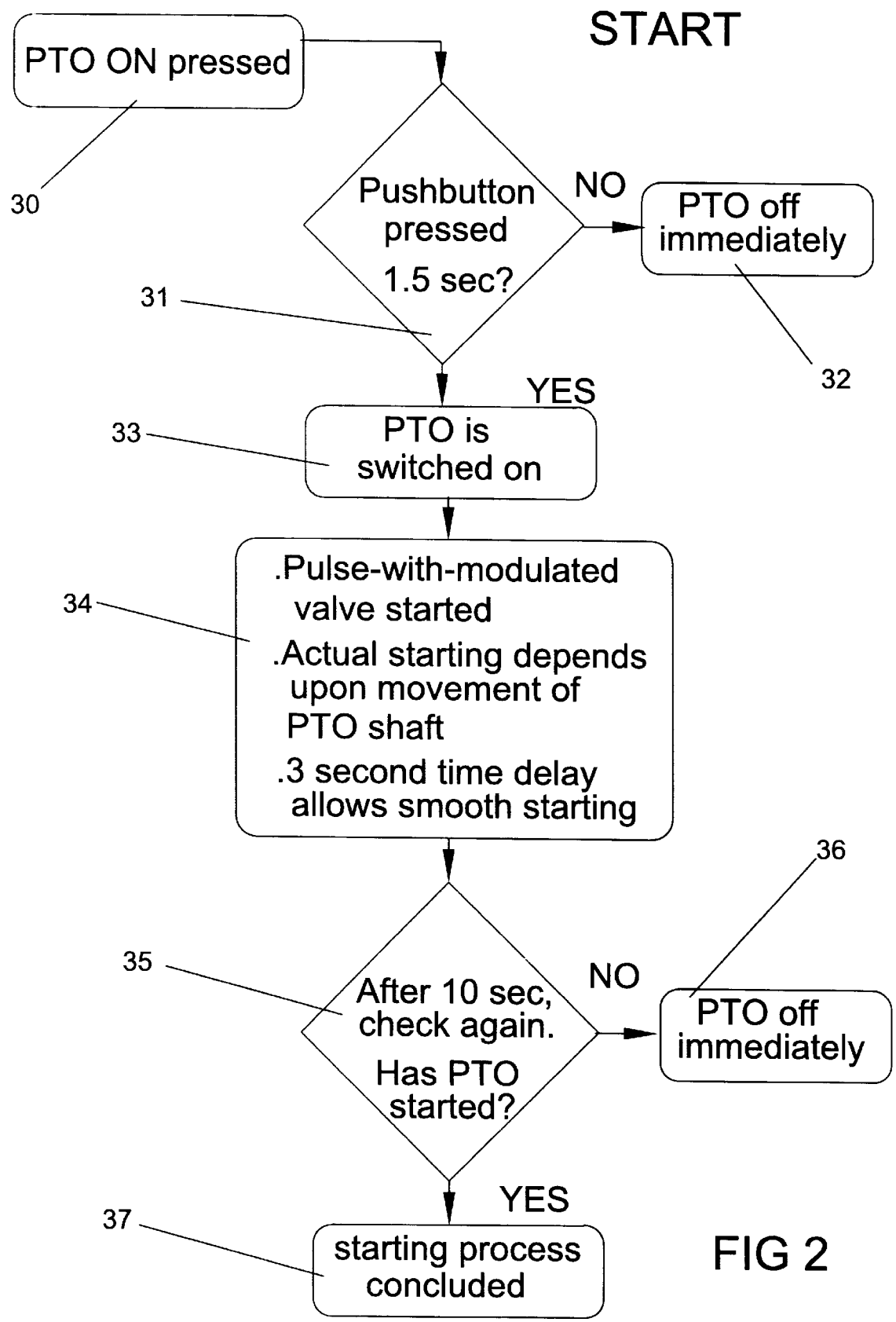
FIG. 2—a flow diagram of an operating phase.

FIG. 2 shows the steps involved in switching on and starting the PTO shaft. To initiate the engagement, pushbutton 11 is pressed (Field 30). In accordance with Field 31, interrogation is done to determine whether pushbutton 11 is still depressed during a first time interval (about 1.5 seconds). If pushbutton 11 is released before this first time interval elapses, the command is not accepted, Field 32. If the pushbutton 11 is pressed long enough, valve 16 for starting the PTO shaft is actuated, Field 33. Within an initial time interval, the start is accomplished by starting the pulse-width-modulated valve 16 in accordance with a stored starting function (Field 34). For jolt-free control of the start, the starting of PTO clutch 2 is influenced by the pulse-width or the point in time at which the PTO shaft starts to move, which is signaled to the control unit 10 via sensor 22. At this point, the PTO should be running. To confirm this, after a second time interval (about 10 or 20 seconds), another check is made according to Field 35 on the basis of the PTO shaft speed signaled by sensor 22 to determine whether the PTO shaft has actually started. If not, the PTO clutch 2 is immediately disengaged again (Field 36). If the control in Field 35 is positive, the starting process is stopped, Field 37.

Figure 3:
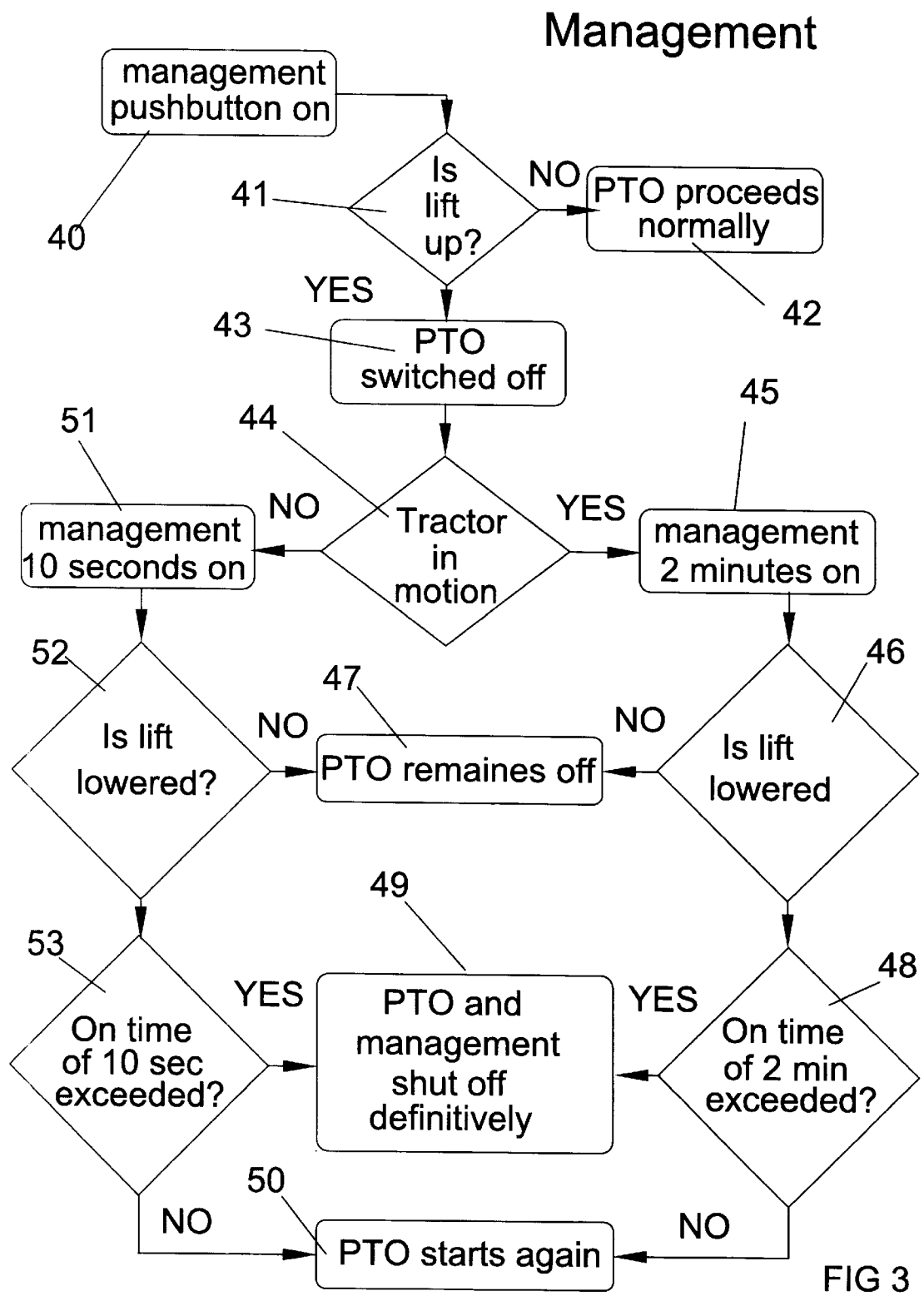
FIG. 3—a flow diagram in automatic mode.

FIG. 3 shows the process sequence in automatic mode, here also called "management." One can switch to this mode only if the PTO shaft has already started to turn. For this purpose, switch 12 (FIG. 1) is placed in the position "management pushbutton on" (Field 40). For safety's sake, the system interrogates, according to Field 41, whether the power lift is raised or is being raised. If not, the PTO shaft continues to run normally (Field 42) until, at any subsequent point in time, the power lift is raised by actuating lift lever 9. This lifting is signaled by sensor 23 to control unit 10. As soon as the signal is received, the PTO clutch 2 is disengaged, thereby switching off the PTO shaft drive (Field 43).

For automatically re-starting the PTO shaft when the power lift is lowered, a case distinction is made between two operating states. For this purpose, sensor 24 first interrogates. Field 44 whether the tractor is in motion. If it is in motion, a time gate is opened (Field 45), so that the automatic re-starting of the PTO shaft occurs only when the power lift is lowered again within the time interval (2 minutes) determined with this time gate. If the power lift is not lowered (Field 46), the PTO shaft remains switched off (Field 47). If the power lift is lowered, interrogation is done in Field 48 to determine whether the first time interval has elapsed. If it has elapsed, both the PTO shaft and the automatic mode are switched off (Field 49). If it has not elapsed, the PTO clutch is engaged again (see FIG. 2, from Field 33 on and Field 50 in FIG. 3). However, if the tractor is stopped, the prescribed second time interval is considerably shorter, about, 10 sec. The first time interval is designed so that, after the tractor turns at the edge of a field and the power lift is lowered again, the PTO shaft is switched on again. The predetermined second time interval is designed so that it elapses before the operator has the time to leave the operator's cabin. If the lift is not lowered (Field 52) the PTO remains disengaged (Field 47); however, if the lift is lowered after the 10 second interval (Field 53), the PTO and automatic mode are shut off indefinitely (Field 49). If, on the other hand, the lift is lowered within the 10 second interval (Field 53), the PTO starts once more (Field 50). Thus, it may happen under certain circumstances that the operator is injured while manipulating the implement.

Figure 4:
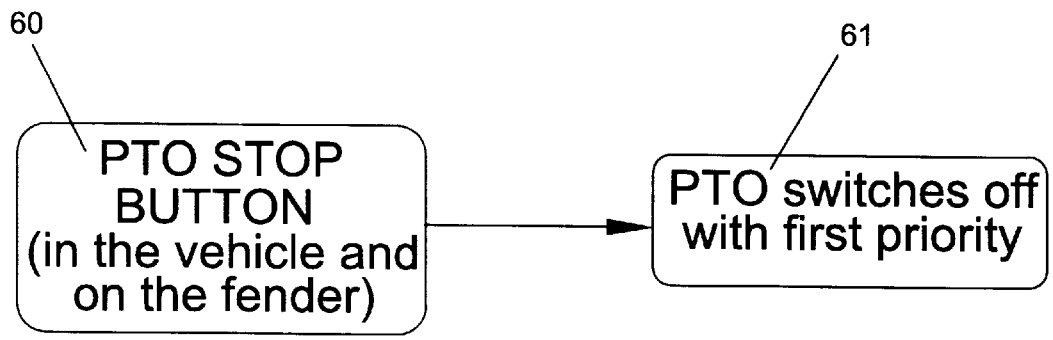
FIGS. 4 and 5—two flow diagrams with additional safety functions.
Figure 5:
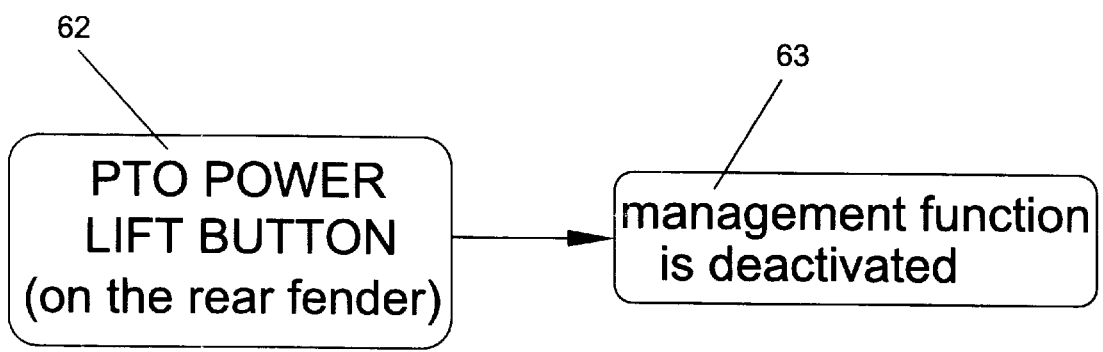

FIGS. 4 and 5 show another two safety functions. In accordance with Fields 60, 61, the PTO shaft is switched off at highest priority when either of the "PTO stop" pushbuttons 13, 13A, i.e., either 13 in the operator's cabin or 13A accessible from the outside, is actuated.

In accordance with Fields 62, 63, the automatic mode is deactivated and hence the PTO shaft switched off simultaneously as soon as one of actuating elements 13A or 15 of the vehicle's switching unit 14 accessible from the outside is actuated, i.e., even if only the power lift is being actuated. Frequently, the switching unit 14 is designed without the actuating element 13A.

Automatic mode can be started only from within the cabin and is also deactivated by actuating either pushbutton "PTO stop" 13 or 13A. Then automatic mode can be switched on again only if the PTO shaft is started again. Thanks to the present invention, absolute safety is combined with a maximum of operator comfort in the manner described herein.

What is claimed is:

1. A method for controlling a drive of a tractor power take-off (PTO) shaft, wherein the PTO shaft can be connected to a drive engine via a PTO clutch, and a tractor possesses a hydraulic power lift to which an implement driven by the PTO shaft can be connected, comprising the following steps:

a) actuating a first switch for switching on the PTO shaft, whereby the PTO clutch is engaged by a pulse-width-modulated on/off valve, so as to start in a controlled manner;

b) actuating a second switch to an automatic mode, whereby the PTO clutch is disengaged when the power lift is raised; if the lift is not raised, the PTO clutch remains engaged; and c) sensing if the power lift is lowered within a prescribed time interval, whereby the PTO clutch is automatically engaged again, but after this prescribed time interval expires, the PTO clutch does not engage again.

2. The method according to claim 1, further comprising the step of sensing when the PTO shaft is switched on, the starting of the PTO shaft is immediately interrupted by disengaging the clutch if the first switch does not remain actuated for a first time interval.

3. The method according to claim 2, further comprising the step of sensing when the PTO shaft has been switched on for a specific initial time interval, and only after the initial time interval has elapsed can the automatic mode be switched on.

4. The method according to claim 3, further comprising the step of interrogating to determine when the PTO shaft has been switched on for a second time interval, which is longer than the first time interval, whether the PTO shaft is actually turning; if not, the PTO clutch is immediately completely disengaged.

5. The method according to claim 1, further comprising the step of sensing a momentary speed of the PTO shaft when said shaft is started in a controlled manner.

6. The method according to claim 5, further comprising the step of sensing the pulse width at which the PTO shaft begins to move.

7. The method according to claim 1, further comprising the step of interrogating after the power lift is raised to determine whether the tractor is moving or stopped; if it is moving, the clutch is automatically engaged only if the power lift is lowered again within a first time interval; if it is stopped, the clutch is engaged automatically again only if the power lift is lowered again within a second time interval; the second time interval is shorter than the first time interval.

8. The method according to claim 1, wherein the tractor additionally possesses control switches located outside an operator's cabin for the PTO shaft and the power lift, characterized by the fact that the PTO clutch is immediately disengaged and the automatic mode switched off as soon as one of the control switches outside the operator's cabin is actuated.

9. The method according to claim 1, further comprising the step of interrogating the drive engine speed and engaging the PTO clutch only if the engine speed is within a certain range.

* * * * *